Oct. 14, 1941.  A. W. MALL  2,259,113
ROTOR FOR CONCRETE VIBRATORS
Filed Oct. 23, 1939  3 Sheets-Sheet 1
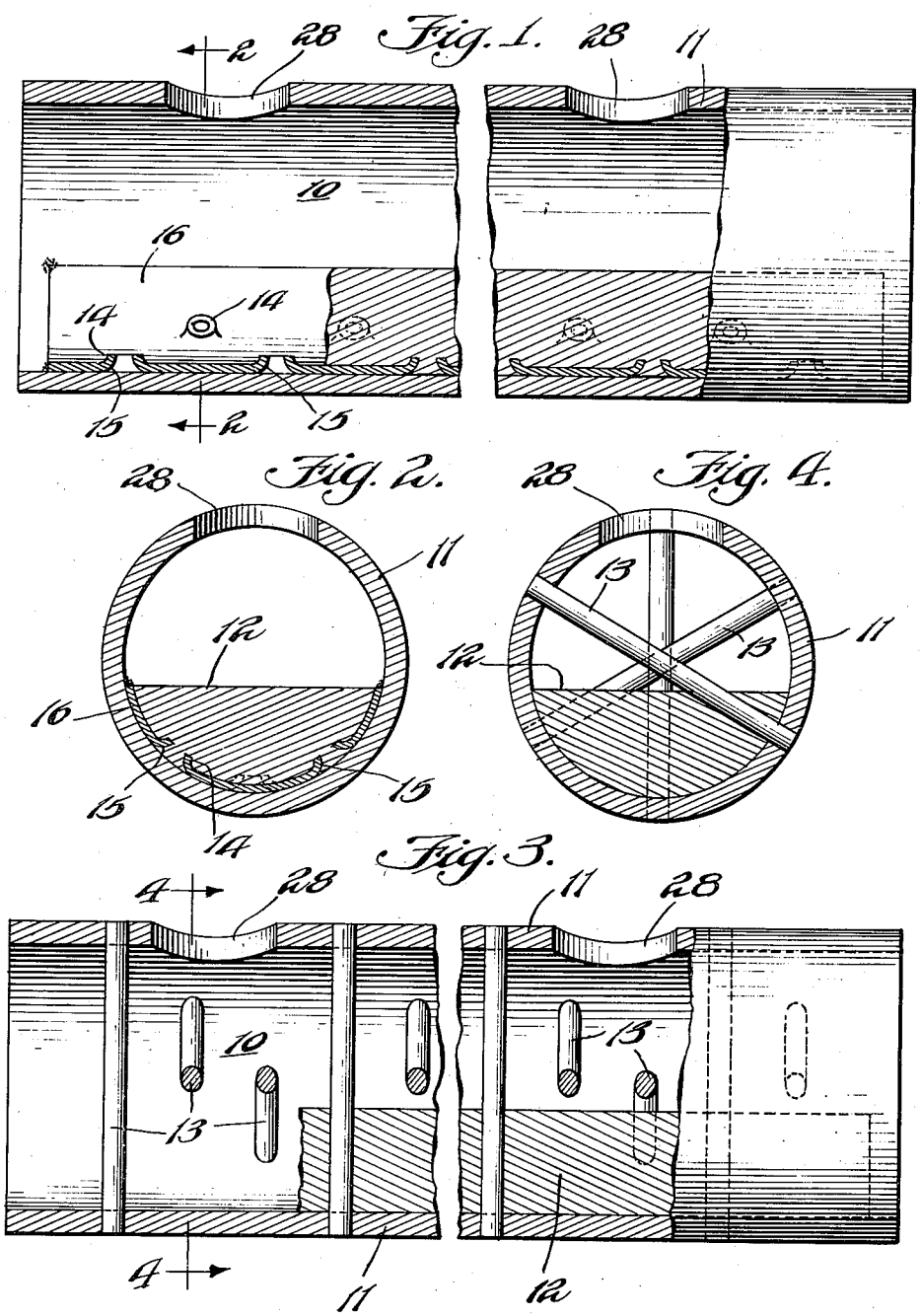
INVENTOR.
Arthur William Mall
BY Albert Latta
ATTORNEY.

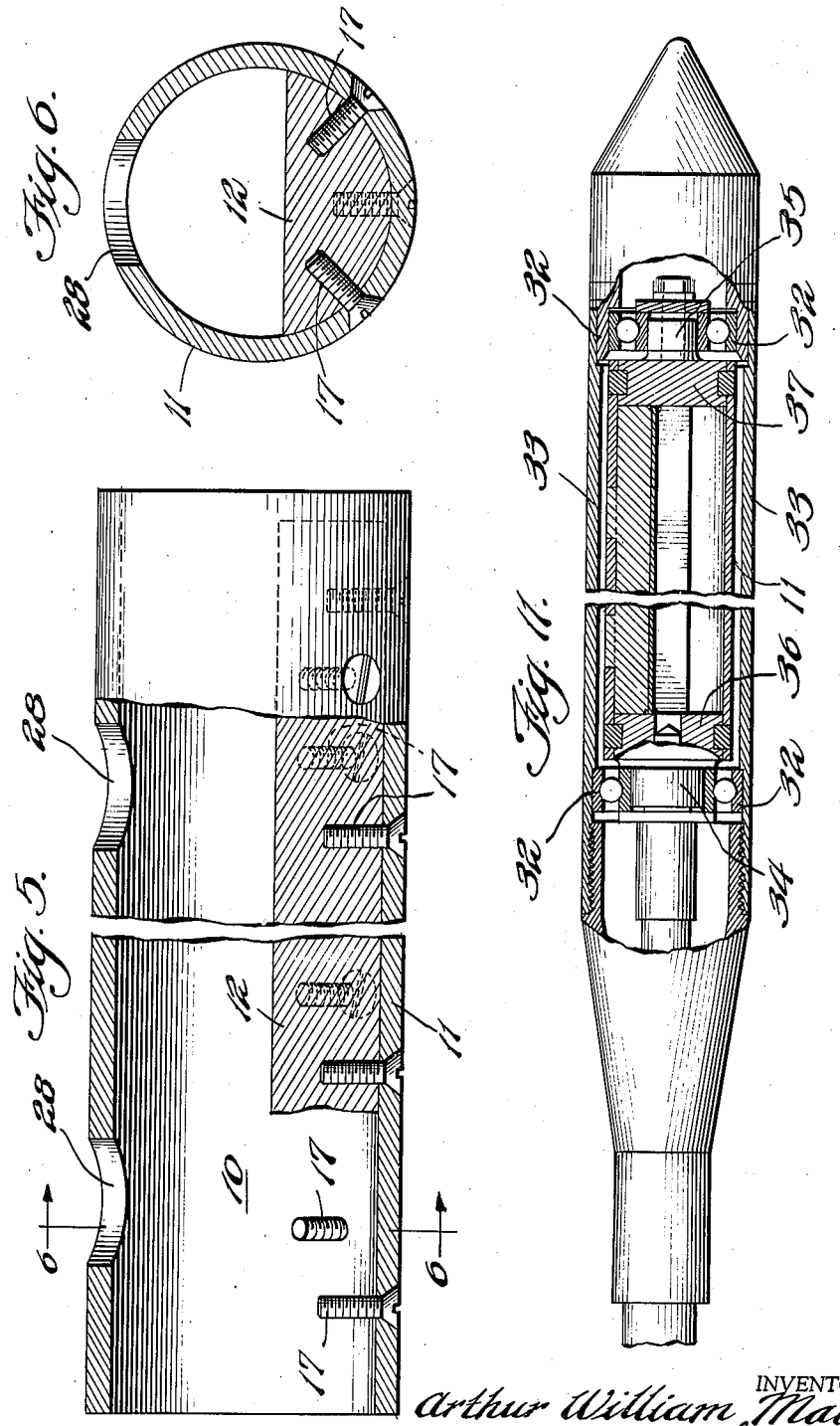

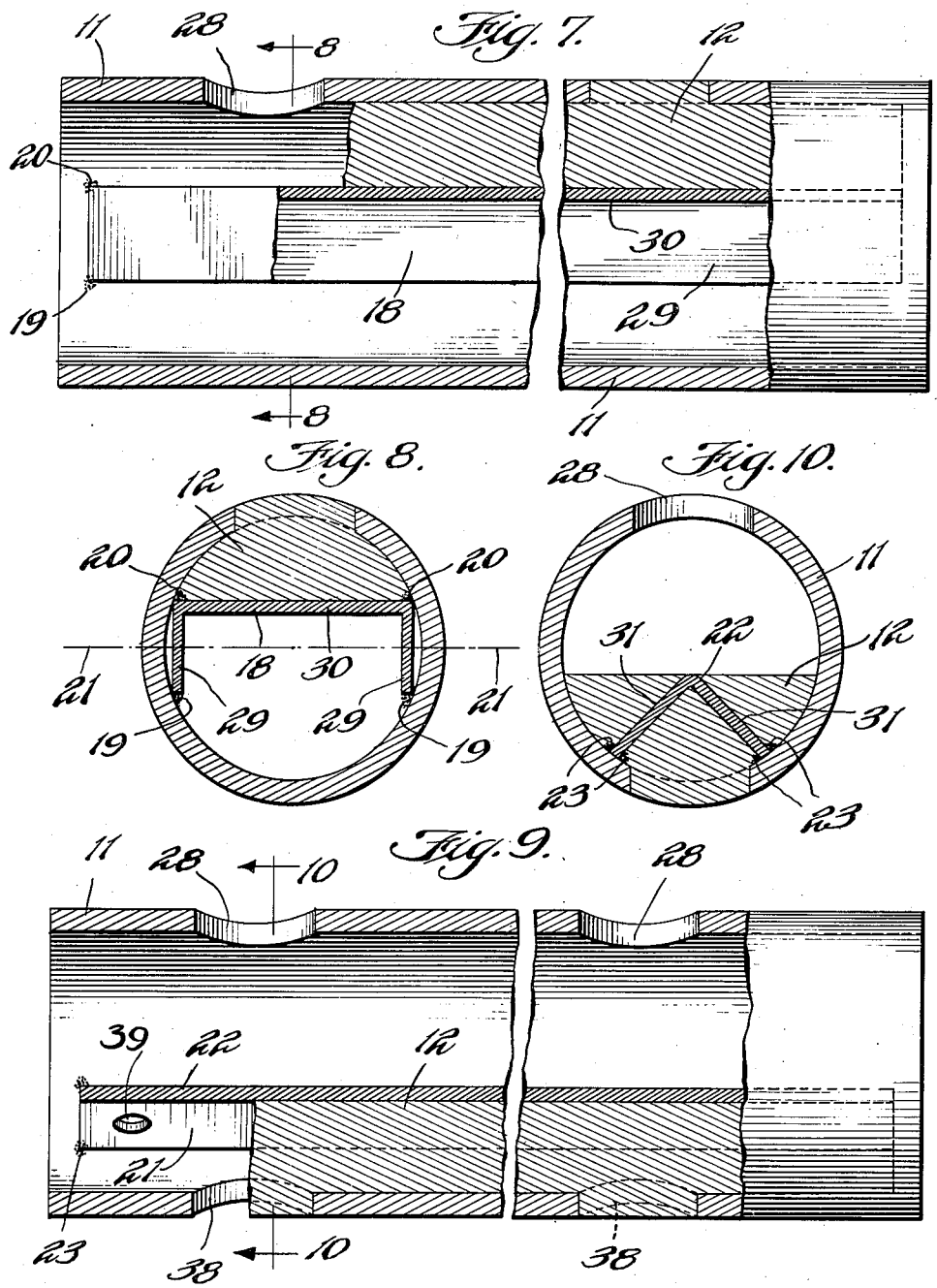

Patented Oct. 14, 1941

2,259,113

UNITED STATES PATENT OFFICE 2,259,113

ROTOR FOR CONCRETE VIBRATORS

Arthur William Mall, Flossmoor, Ill., assignor to Mall Tool Company, Chicago, Ill., a corporation of Illinois Application October 23, 1939, Serial No. 300,785

8 Claims. (Cl. 259—1)

My invention relates to improvements in eccentrically weighted rotors for concrete vibrators and the like.

Concrete vibrators are by their nature self destructive and methods are continually sought for improving the construction of these devices so that they will better withstand the destructive effect of the vibrations.

Also, in the construction of a commercially practical vibrator for concrete work there are a number of limitations with respect to dimensions, and weight which must be considered. One requirement is that the vibrator be small enough and light enough for a man to handle and move about with ease. Another requirement is that the diameter of the vibrating element be restricted so that the vibrator may be easily manipulated in narrow wall forms and amongst closely spaced reinforcing.

In conjunction with these limitations the desire to construct a vibrator which will produce a maximum amount of work-output per unit of applied energy forms the foundation of this invention. To obtain this result I have constructed a rotor comprised of a cylindrical housing which supports a weight of high specific gravity in a position of maximum eccentricity relative to the axis of the rotor.

A major problem is that of supporting the weight in a fixed position of eccentricity within the housing, with sufficient security to prevent loosening or dislodgment of the weight under the effect of vibration.

One object of my invention is to provide a rotor for a vibrator having a weight of high specific gravity, such as lead, supported in a position of maximum eccentricity relative to the axis of the rotor.

Another object is to provide improved supporting means for maintaining the weight in a position of maximum eccentricity relative to the axis of the rotor.

A further object is to provide a rotor formed of a cylindrical housing and having improved means for supporting the eccentric weight to prevent it from becoming dislodged from its permanently fixed position within the housing.

Another object is to provide simpler and less expensive means for supporting the weight in its position of maximum eccentricity relative to the axis of the rotor.

Another object is to construct a rotor which will withstand the terrific strain caused by the centrifugal force of the eccentric weight rotating at a tremendous speed.

Other objects and advantages will be apparent upon reading the description and the accompanying drawings, forming a part of the specification, in which:

Fig. 1 is a side elevation partially in section showing the cylindrical housing and eccentric weight therein;

Fig. 2 is a sectional view taken on line 2—2 of Fig. 1;

Fig. 3 is a side elevation partially in section showing the cylindrical housing with a modified means for supporting the eccentric weight within the housing;

Fig. 4 is a sectional view taken on line 4—4 of Fig. 3;

Fig. 5 is a side elevation view of the cylindrical housing showing another modified form of the invention;

Fig. 6 is a sectional view taken on line 6—6 of Fig. 5;

Fig. 7 is a side elevation view showing another modified form of the invention;

Fig. 8 is a sectional view taken on line 8—8 of Fig. 7;

Fig. 9 is a side elevation view of another modified form of the invention;

Fig. 10 is a sectional view taken on line 10—10 of Fig. 9;

Fig. 11 is a sectional view of the rotor rotatably mounted in bearings within the outer casing.

In general my invention comprises a rotor 10 for a vibrator, such as is shown in Fig. 11, formed preferably of a cold rolled steel tubular housing 11 and an eccentric weight 12 preferably of lead because of its high specific gravity, disposed within the housing 11 and secured therein by suitable supporting means.

In using lead as the eccentric weight it becomes possible to confine the diameter of the rotor to a minimum size, and still obtain a maximum amount of work-output from the rotor. This is due to the high specific gravity of lead. However when lead is used as an eccentric weight and is rotated at high speeds such as 7,000 R. P. M. there is created such a tremendous amount of centrifugal force, that it requires very strong supporting members to retain the lead in a fixed position. Lead, itself, being of comparatively soft material is incapable of supporting itself when rotated at tremendous speeds. My present invention comprises an improvement over the type of supporting means shown in my Patent No. 2,073,393.

Referring to Figs. 1 and 2 there is shown one form of the invention. The rotor which is generally referred to at 10 comprises a cylindrical housing 11, previously described as being formed of a steel tube, with a weight 12 of high specific gravity disposed within housing 11 in a position of maximum eccentricity relative to the axial center of the rotor 10. The supporting member 16 which retains the eccentric weight 12 in a fixed position within the housing may comprise a piece of sheet metal stamped with a plurality of frusto-conically shaped perforations 14 throughout the area and formed so as to snugly fit the cylindrical inner wall of the housing 11. The supporting member 16 may be welded or otherwise rigidly secured to the inner wall of the housing. With the ends of the housing sealed by suitable heads 36 and 37 as shown in Fig. 11 the eccentric weight 12 is adapted to be poured while in a molten state into the housing through one of the openings 28, the other opening being provided as a vent for the escape of the hot vapors. The molten metal runs through the perforations 14 against the inner wall of the housing 11. When the desired amount of molten metal is poured into the housing, it is allowed to cool and when it becomes solidified the entire mass is rigidly secured within the housing by means of the head portions which form within the perforations. It is apparent that the frusto-conical walls 15 of the perforations 14 will obtain a firm purchase against the headed portions of the lead weight formed within them. The distribution of the perforations throughout the entire surface of the support member 16 assures a firm anchoring of the eccentric weight from every conceivable angle at which the weight might have a tendency to become dislodged.

In Figs. 3 and 4 a modified form of the invention is shown. The cylindrical housing 11 is provided with a plurality of metal pins 13 extending across the housing from one wall thereof to the opposite wall. These pins may be securely held in place within the housing by any suitable means; such as providing openings in the housing of a smaller diameter than the pins so that the ends of the pins assume a pressed fit in the openings.

These pins extend across the housing in any of a number of different directions and when the lead or other material is poured into the housing and allowed to solidify, it is firmly and securely anchored in position by the pins. The irregular positioning of the pins assures a firm locking of the weight against any tendency to become dislodged.

In Figs. 5 and 6 the eccentric weight is securely locked in position by the screws 17 which are extended through openings in the housing and embedded in the weight 12 by the casting of the weight around them. The screws 17 are preferably of the flat-head type and are countersunk into the wall of the housing so that no part of the head of the screw projects beyond the outer surface of the housing. The binding of the molten lead around the threads of the screws assures a firm locking of the eccentric weight 12 in position.

In Figs. 7 and 8 another form of supporting means is shown. The cylindrical housing 11 is provided with the openings 28. The support 18 for the eccentric weight 12 is formed from sheet metal and shaped similar to a channel iron. The sides 29 are preferably at right angles to the base 30 and the channel iron extends longitudinally through the housing so as to assume a position in which the top and bottom longitudinal edges of the sides 29 are in contact with the inner wall of the housing 11, as best shown in Fig. 8. When the channel iron is in this position a center line 21 drawn through the sides 29 coincides with a diameter of the housing. In this position the channel iron provides maximum support for the eccentric weight 12. The channel iron may be held in place within the housing by spot welding at points 19 and 20.

The sides 29, through the engagement of either edge regions with the converging inner surfaces of the housing 11, act as braces to secure the web portion 30 against dislodgment independently of the weldings 19 and 20. Thus the weldings 19 and 20 need not be relied upon as the sole means for anchoring the web member 30. The channel iron provides the combination of a partition member (the web 30) and a pair of braces (the sides 29) which being formed integrally as a single stamping, may be readily inserted in the housing 11, will be self-locating in the housing and cannot get out of position, and which may therefore be welded in place with ease and will remain in position supporting the weight 12, no matter how intense may be the vibration to which the rotor is subjected and even though the welds 19 and 20 may fail.

Figs. 9 and 10 provide improved means for supporting the weight 12 within the housing 11. An angle iron 22 the sides 31 of which are preferably of equal length and width extends longitudinally through the housing and is spot welded to the inner wall thereof at 23. The molten metal is poured into the housing through one of the holes 28 and allowed to flow through openings 39 (of which there may be several distributed throughout the area of the angle iron, only one being shown in the drawings) of the angle iron so as to fill spaces on both sides thereof. When solidified the several sections of the weight are joined together by bridging portions extending through the openings 39. If desired, in order to assure filling of the space between the lip of the angle iron, the lead may be poured from both sides, through the openings 38 and 28 respectively.

The completed rotor is adapted to be rotatably mounted in suitable bearings 32 within an outer casing 33 by means of stub shafts 34 and 35 secured to each end of the rotor. The ends of the housing 11 are closed by suitable heads 36 and 37 which carry the stub shafts 34 and 35.

While I have illustrated and described a specific embodiment of my invention, it will be apparent to those skilled in the art that changes and modifications may be made in the exact details shown, and I do not wish to limit myself in any particular; rather what I desire to secure and protect by Letters Patent of the United States is:

1. A rotor for a concrete vibrator comprising an elongated thin-walled cylindrical housing formed of steel high in strength and rigidity, said housing being less than 3 inches in diameter, a weight of high specific gravity disposed within the housing in a position of maximum eccentricity relative to the axis of the rotor, and means for rigidly supporting said weight in its position of maximum eccentricity, said means including a semi-cylindrical sheet of metal welded to the inner wall of the housing and having a plurality of perforations in its surface, each of said perforations describing a substantially frusto-conically shaped projection extending into the housing in a radial direction.

2. A rotor for a vibrator for plastic materials comprising an elongated thin-walled tubular housing formed of metal high in strength and rigidity, a weight of high specific gravity disposed within the housing in a position of maximum eccentricity relative to the axis of the rotor and means for rigidly supporting said weight in its position of maximum eccentricity, said means including a plurality of hollow projections secured to the inner wall of the housing and spaced apart in staggered relation to each other, said weight adapted to be poured into and among said hollow projections while in a molten state.

3. A rotor for a vibrator for plastic materials comprising an elongated thin-walled tubular housing formed of metal high in strength and rigidity, a weight of high specific gravity disposed within the housing in a position of eccentricity relative to the axis of the rotor, and means for rigidly supporting said weight in its position of eccentricity within the housing to prevent its becoming dislodged when said housing is rotated, said means including a plurality of hollow projections secured to the inner wall of the housing and arranged in spaced relation to each other.

4. A rotor for a concrete vibrator comprising a rotative support member, a weight disposed eccentrically of the axis of rotation of the support member, and means for securing the weight to the support member to prevent its becoming dislodged relative to the support member when said support member is rotated, said securing means including one or more hollow projections rigidly secured to the support member and extending into the weight.

5. A rotor for a concrete vibrator comprising a rotative hollowed metal support member, a weight disposed within the support member in a position of eccentricity to the axis of rotation of said member, and means within said member for securing the weight to said member, said means comprising one or more hollow projections within said member and secured thereto and extending into the weight.

6. A rotor for a concrete vibrator comprising a rotative hollowed support member, a weight supported within the support member eccentrically of its axis of rotation, and means within said support member for securing the weight thereto, said means comprising a perforated stamping having inwardly extending projections disposed within the member between the weight and the member.

7. A rotor for a concrete vibrator comprising a rotative support member, a weight secured to the support member in a position of eccentricity relative to the axis of rotation of said member, and means for securing the weight to the rotative member comprising one or more hollow projections interposed between the weight and the support member, whereby the weight and the support member are substantially integrally united.

8. A rotor for a concrete vibrator comprising a rotative hollowed support member, a weight disposed within and secured to the support member in a position of eccentricity relative to the axis of rotation of said member, and means within said member for securing the weight thereto, said means including one or more hollow projections interposed between the weight and support member, whereby the weight and support member are substantially united.

ARTHUR WILLIAM MALL.